United States Patent
Misawa

[11] 3,734,556
[45] May 22, 1973

[54] GRIPPER DEVICE FOR INDUSTRIAL ROBOTS OR THE LIKE

[75] Inventor: Hiroshi Misawa, Komatsu, Japan

[73] Assignee: Kabushiki Kaisha Komatsu Seisakusko, Tokyo, Japan

[22] Filed: July 7, 1971

[21] Appl. No.: 160,395

[52] U.S. Cl..................................294/88
[51] Int. Cl..............................B66c 1/00
[58] Field of Search................294/88, 92, 67 BB, 294/67 BC, 67 EA, 86.15; 214/1 CM, 114; 37/182, 183 A, 183 R

[56] References Cited
UNITED STATES PATENTS

| 3,655,232 | 4/1972 | Martelee | 294/67 BB |
| 3,199,910 | 8/1965 | Bradley | 294/88 |

Primary Examiner—Richard Aegerter
Assistant Examiner—Douglas Bellis
Attorney—James E. Armstrong et al.

[57] ABSTRACT

A gripper device for industrial robots or the like which includes a sleeve connected integrally with a support member for gripping arms and through which a piston rod for moving said arms towards and away is slidably disposed, said sleeve being formed with a pinion at the inner end thereof, and a cross-shaped cylinder having two cylinder portions, each having a respective axis disposed at a right angle relative to each other and spaced in the vertical direction, one of said cylinder portions receiving a spool formed with a rack engageable with said pinion therein and the other receiving a piston for moving said gripping arms towards and away therein, said cylinder portion receiving the spool being rotatably carried by base members and connected with a rotary mechanism.

2 Claims, 4 Drawing Figures

GRIPPER DEVICE FOR INDUSTRIAL ROBOTS OR THE LIKE

BRIEF SUMMARY OF THE INVENTION

This invention relates to a gripper device for manipulators or industrial robots etc.

The device for gripping, removing and turning in manipulators or industrial robots etc., should desirably be capable of moving up and down in the vertical direction in addition to gripping and rotating about the longitudinal axis of the gripping arms. By combining such three functions, it becomes possible for gripping arms to move in every direction.

Hydraulic drive system of the kind wherein a fluid under a pressure is employed for driving the gripper mechanism and the rotary mechanism which enables gripping arms to be rotated about the longitudinal axis thereof have heretofore been developed since they are relatively simple in mechanism. However, where a hydraulic means for moving the gripping arms up and down is provided in the device in addition to the above-mentioned gripper mechanism and rotary mechanism, the construction of the device itself becomes complicated and large-sized and so it is unavoidable that the control of the device becomes very difficult.

The present invention has been deviced in order to eliminate such difficulties mentioned above and has for its object to provide a compact and simplified gripper device having gripping arms which are capable of effecting three functions, i.e., gripping, rotating and moving up and down by means of a fluid under a pressure therefor.

The gripper device for industrial robots or the like according to the present invention is characterized by that device includes a sleeve connected integrally with a support member for gripping arms and through which a piston rod for moving said arms towards and away is slidably mounted, said sleeve being formed with a pinion at the inner end thereof, and a cross-shaped cylinder having two cylinder portions, each having a respective axis disposed at a right angle relative to each other and spaced in vertical direction, one of said cylinder portions receiving a spool formed with a rack engageable with said pinion therein and the other receiving a piston for opening and closing said gripping arms therein, said cylinder portion receiving the spool being rotatably carried by base members and connected with a rotary mechanism.

DETAILED EXPLANATION OF THE INVENTION

For better understanding of the invention, one embodiment thereof will be described in detail below with reference to the drawings.

Figure 1:
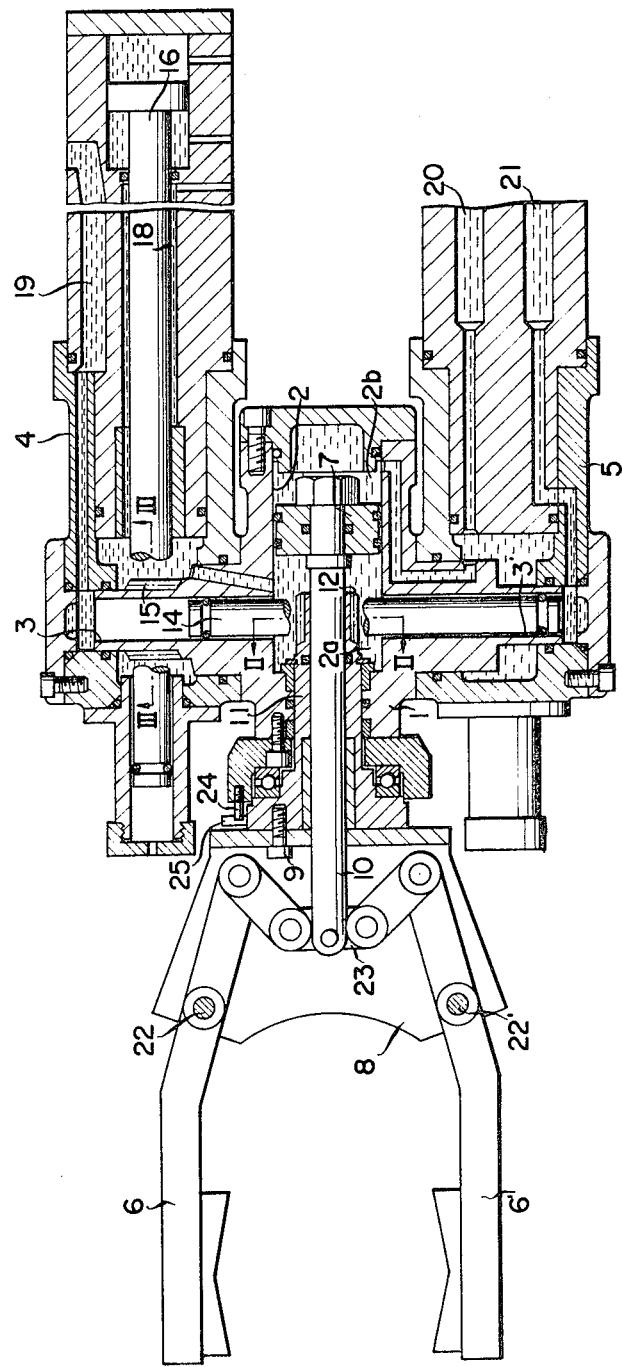
FIG. 1 is a horizontal sectional view of the gripper device according to the invention.
Figure 2:
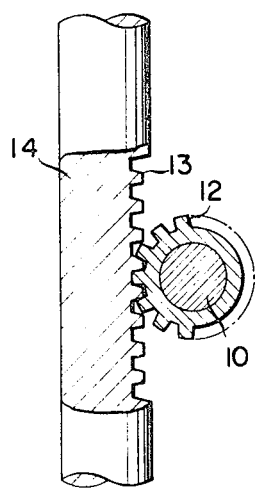
FIG. 2 is a sectional view taken along the line II — II of FIG. 1.

Referring to the drawings and more particularly to FIG. 1, the gripper device includes a cross-shaped cylinder 1 having two cylinder portions 2 and 3, 3', each having a respective axis disposed at a right angle relative to each other and spaced in vertical direction of the device, said cylinder portions, 3, 3' being carried by two base members 4, 5 extending in parallel relationship so as to rotable about an axis disposed near the innermost ends of the members. Accommodated within said cylinder part 2 are a piston 7 for moving gripping arms 6, 6' towards and away and a pinion 12 which is formed at the inner end of a sleeve 11. Said sleeve 11 is integrally connected with a support member 8 for gripping arms 6, 6' by means of bolt 9, and through which a piston rod 10 for said piston 7 is disposed so as to slide in its longitudinal direction. Accomodated slidably within said cylinder portions 3, 3' is a spool 14 formed with a rack 13 engageable with said pinion 12 (Refer to FIG. 2.).

Figure 3:
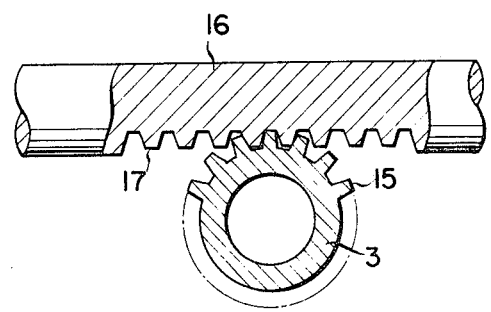
FIG. 3 is a sectional view taken along the line III — III of FIG. 1.
Figure 4:
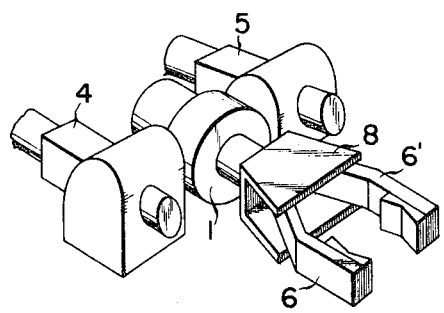
FIG. 4 is a schematic perspective view of the gripper device.

The cylinder portion 3 is formed with a pinion 15 on the outer periphery thereof, said pinion 15 is engaged with a rack 17 which is intergrally formed with a piston rod 16. Said piston rod 16 is slidably disposed within said base member 4 (Refer to FIG. 3.). Formed within the base member 4 are passages 18, 19 for fluid under a pressure, and also formed within the base member 5 are passages 20, 21 for fluid under a pressure (The fluid employed in this embodiment is an oil hydraulic.). Said passages 18, 19 communicate with a chamber 2a at the front side of the cylinder portion 2 of said cross-shaped cylinder 1 and a chamber 2b at the rear side thereof respectively. Said passages 20, 21 for fluid under a pressure communicate with the cylinder portions 3, 3' of cross-shaped cylinder 1 respectively.

Reference numeral 22, 22' denote fulcrums of gripper arms 6,6', 23 a toggle link connecting said rod 10 with the inner ends of the gripping arms 6, 6', and 24, 25 stoppers adapted to prevent the sleeve 11 from rotating more than one revolution relative to the cross-shaped cylinder 1.

The device according to the present invention is arranged such that, when fluid under a pressure flows in the passage 18 and returns to the passage 20 so that the chamber 2a of the cylinder portion 2 of the cross-shaped cylinder 1 is subject to a high pressure, the piston 7 is urged rearward and the gripping arms 6, 6' are moved toward through the movement of the rod 10 and the toggle link 23 to commence their grip motion.

On the contrary, when fluid under a pressure flows in the passage 20 and returns to the passage 18 so that the chamber 2b is subject to a high pressure, the piston 7 is urged forward so as to allow the gripping arms 6, 6' to move away.

Next, when fluid under a pressure flows in the cylinder portion 3 through the passage 19 and returns to the passage 21, the spool 14 is moved towards the cylinder portion 3' so as to turn the pinion 12 of the sleeve 11 engageable with the rack 13 of the spool 14, thereby turning said sleeve 11, support member 8 integrally secured thereto and the gripping arms 6, 6' carried by the member 8 in clockwise direction.

Reversely, when fluid under a pressure flows in the cylinder portion 3' through the passage 21 and returns to the passage 19, the spool 14 is urged towards the cylinder part 3, thereby to turn the gripping arms 6, 6' in anticlockwise direction.

When the piston rod 16 is urged forward within the base member 4, the cross-shaped cylinder 1 is turned so as to bring the outer end thereof or the gripping arms 6, 6' up in the vertical direction by engagement of the pinion 15 formed on the outer periphery of the cylinder portion 3 with the rack 17 of the piston rod 16, regardless of whether the arms 6, 6' are moving towards or away or turning in clockwise or anticlockwise direction.

On the contrary, when the piston rod 16 is urged rearward within the base member 4, the cross-shaped cylinder 1 is turned so as to bring the outer end thereof, that is to say; the gripping arms 6, 6' down in the vertical direction.

As can be seen from the foregoing, since the gripper device for industrial robots or the like according to the present invention is capable of effecting all the motions of gripping, turning and moving up and down in spite of its being simple in construction, this device is very suitable for use with small-sized and light weight manipulators and industrial robots which necessitate to move in every direction by combination of the above-mentioned three functions.

What I claim is:

1. A gripper device for industrial robots or the like characterized by that said device includes gripping arms, a support member carrying said gripping arms so as to allow the latter to move towards and away freely, a cross-shaped cylinder having two cylinder portions, each having a respective axis disposed at a right angle relative to each other and spaced in vertical direction, a connecting means interconnecting a piston rod received in one of the cylinder portions of said cross-shaped cylinder with the inner base ends of said gripping arms, a sleeve through which said piston rod is slidably disposed, said sleeve being intergarally connected to said support member and having a pinion formed on its outer periphery, a spool received in the other cylinder portions of said cross-shaped cylinder and having a rack engageable with said pinion formed thereon, a rotary mechainism associated with said cylinder receiving the spool therein, and base members carrying the cylinder portions in which said spool is received so as to allow the cylinder portions to turn freely.

2. A gripper device for industrial robots or the like according to claim 1 characterized by that the cylinder portions receiving a spool therein is formed with a pinion on its outer periphery, said pinion being engageable with a rack formed on the piston rod which is received in the cylinder of the base member.

* * * * *